(12) United States Patent
Jeong et al.

(10) Patent No.: US 11,385,874 B2
(45) Date of Patent: Jul. 12, 2022

(54) AUTOMATIC TYPE DETERMINATION FOR DATABASE PROGRAMMING

(71) Applicant: SAP SE, Walldorf (DE)

(72) Inventors: Chanho Jeong, Seoul (KR); Boyeong Jeon, Seoul (KR); Kiyoung Kim, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/780,706

(22) Filed: Feb. 3, 2020

(65) Prior Publication Data

US 2021/0240455 A1 Aug. 5, 2021

(51) Int. Cl.
*G06F 9/44* (2018.01)
*G06F 8/41* (2018.01)

(52) U.S. Cl.
CPC .............. *G06F 8/437* (2013.01); *G06F 8/427* (2013.01)

(58) Field of Classification Search
CPC ....................................................... G06F 8/437
USPC ......................................................... 717/140
See application file for complete search history.

(56) References Cited

U.S. PATENT DOCUMENTS

| | | | | |
|---|---|---|---|---|
| 6,704,747 B1 * | 3/2004 | Fong | ...................... | G06F 16/252 |
| 7,669,191 B1 * | 2/2010 | Kelly | ...................... | G06F 8/437 |
| | | | | 717/140 |
| 7,797,304 B2 * | 9/2010 | Muralidhar | ............. | G06F 16/84 |
| | | | | 707/713 |
| 7,873,611 B2 * | 1/2011 | Ebersole | ........... | G06F 16/24526 |
| | | | | 707/701 |
| 7,873,627 B2 * | 1/2011 | Grabs | ............... | G06F 16/24542 |
| | | | | 707/713 |
| 7,996,416 B2 * | 8/2011 | Ebersole | ........... | G06F 16/24526 |
| | | | | 707/759 |
| 8,429,601 B2 * | 4/2013 | Andersen | .................. | G06F 8/24 |
| | | | | 717/109 |
| 8,631,034 B1 * | 1/2014 | Peloski | ............. | G06F 16/24561 |
| | | | | 707/770 |
| 8,762,942 B2 * | 6/2014 | Langworthy | ........... | G06F 8/437 |
| | | | | 717/117 |
| 8,813,043 B2 * | 8/2014 | Condit | ................ | G06F 11/3608 |
| | | | | 717/136 |
| 8,903,797 B2 * | 12/2014 | Lagerblad | ............. | G06F 16/258 |
| | | | | 707/706 |

(Continued)

OTHER PUBLICATIONS

Andrew D. Gordon et al. "Tabular: A Schema-Driven Probabilistic Programming Language"; POPL '14, Jan. 22-24, 2014, San Diego, CA, USA.*

(Continued)

*Primary Examiner* — Francisco J Aponte
(74) *Attorney, Agent, or Firm* — Fountainhead Law Group P.C.

(57) ABSTRACT

In one embodiment, the present disclosure pertains to automated data type determination of variables that are written in a programming language. In one embodiment, a programming language statement is received. The programming language statement includes a variable, an expression to which the variable is set, and a request to determine a data type of the variable. The expression is processed to deduce a data type of the expression. In certain embodiments, the data type of the expression is then assigned as the data type of the variable such that the data type can be used when the programming language statement is compiled into machine executable code.

15 Claims, 11 Drawing Sheets

(56) References Cited

U.S. PATENT DOCUMENTS

| | | | | |
|---|---|---|---|---|
| 8,949,784 | B2* | 2/2015 | Langworthy | G06F 8/31 |
| | | | | 717/117 |
| 8,996,442 | B2* | 3/2015 | Gould | G06N 5/025 |
| | | | | 706/47 |
| 9,355,145 | B2* | 5/2016 | George | G06F 16/24534 |
| 9,639,335 | B2* | 5/2017 | Hoban | G06F 8/437 |
| 9,830,319 | B1* | 11/2017 | Tortosa | G06F 16/86 |
| 9,977,805 | B1* | 5/2018 | Bowman | G06F 16/381 |
| 10,025,588 | B1* | 7/2018 | Tran | G06F 8/72 |
| 10,228,920 | B2* | 3/2019 | Sevenich | G06F 8/443 |
| 10,255,336 | B2* | 4/2019 | Waas | G06F 16/252 |
| 10,296,313 | B2* | 5/2019 | Poon | G06F 9/45529 |
| 10,366,130 | B2* | 7/2019 | Tsirulnik | G06F 16/954 |
| 10,394,691 | B1* | 8/2019 | Cole | G06F 11/3612 |
| 10,430,606 | B1* | 10/2019 | Levit | G06F 16/252 |
| 10,558,640 | B2* | 2/2020 | Fontaine | G06F 16/2291 |
| 10,915,541 | B2* | 2/2021 | Zoheir | G06F 16/248 |
| 2008/0178149 | A1* | 7/2008 | Peterson | G06F 8/443 |
| | | | | 717/110 |
| 2008/0320453 | A1* | 12/2008 | Meijer | G06F 8/423 |
| | | | | 717/140 |
| 2012/0016912 | A1* | 1/2012 | Schaefer | G06F 16/2448 |
| | | | | 707/803 |
| 2013/0238548 | A1* | 9/2013 | George | G06F 16/2453 |
| | | | | 707/600 |
| 2013/0263099 | A1* | 10/2013 | Box | G06F 8/42 |
| | | | | 717/144 |
| 2015/0269223 | A1* | 9/2015 | Miranker | G06F 16/353 |
| | | | | 707/760 |
| 2017/0046391 | A1* | 2/2017 | Pestana | G06F 16/28 |
| 2018/0095937 | A1* | 4/2018 | Hirayama | G06F 7/02 |
| 2018/0173775 | A1* | 6/2018 | Li | G06F 16/24568 |
| 2018/0189042 | A1* | 7/2018 | Noonan | G06F 8/437 |
| 2018/0189397 | A1* | 7/2018 | Norman | G06F 16/951 |
| 2018/0246931 | A1* | 8/2018 | Jeong | G06F 8/427 |
| 2018/0329916 | A1* | 11/2018 | Waas | G06F 16/252 |
| 2019/0121893 | A1* | 4/2019 | Fender | G06F 16/24534 |
| 2019/0266271 | A1* | 8/2019 | Leau | G06F 16/2433 |
| 2019/0303379 | A1* | 10/2019 | Waas | G06F 16/252 |
| 2019/0340284 | A1* | 11/2019 | Kandukuri | G06F 16/24542 |
| 2019/0340383 | A1* | 11/2019 | Levit | G06F 21/6227 |
| 2020/0394192 | A1* | 12/2020 | Fender | G06F 16/24542 |

OTHER PUBLICATIONS

Leandro T. C. Melo, Rodrigo G. Ribeiro, Breno C. F. Guimarães, and Pereira Fernando Magno Quintão. 2020. Type Inference for C: Applications to the Static Analysis of Incomplete Programs. ACM Trans. Program. Lang. Syst. 42, 3, Article 15 (Nov. 2020), 71 pages.*

Ruud van der Weijde. "Type inference for PHP: A constraint based type inference written in Rascal"; Jan. 11, 2017. Universiteit van Amsterdam Faculteit der Natuurwetenschappen, Wiskunde en Informatica Master Software Engineering.*

* cited by examiner

AUTOMATIC TYPE DETERMINATION FOR DATABASE PROGRAMMING

BACKGROUND

The present disclosure relates to databases, and more particularly, to database procedures and functions.

In procedural languages used in database systems (e.g., structured query language (SQL) scripts), variables containing intermediate values or data may be used. An SQL script, for example, may include one or more SQL commands saved as a file. When the script is executed, variables declared within the script may be assigned to intermediate values or data. The declaration of a variable usually contains a variable name and a data type for that variable. A variable's data type determines the values the variable can have as well as the operations that can be performed on it. In certain instances, the declaration statement of the variable may specify an initial value for the variable as well. In that case, the programmer typically must specify a data type that is the proper data type for the variable.

Table variables may also be declared in a script. Table variables are a kind of variable that holds rows of data in one or more columns. When a table variable is declared, the data types of the one or more columns typically must be specified by the programmer In both cases, the initial value (e.g., the right-hand side of the declare statement) may be complex. As a result, the programmer may need to consider the type semantics of the database system (which could vary across database systems) and all related database objects and expressions contained in the initial value to arrive at the proper data type of the variable. This requires considerable effort on the part of the programmer.

The present disclosure provides techniques for improving procedural languages used in database systems and for improving database procedures.

SUMMARY

In one embodiment, the present disclosure pertains to automated data type determination of variables that are written in a programming language. In one embodiment, a programming language statement is received. The programming language statement includes a variable, an expression to which the variable is set, and a request to determine a data type of the variable. The expression is processed to deduce a data type of the expression, according to various embodiments. In certain embodiments, the data type of the expression is then assigned as the data type of the variable such that the data type can be used when the programming language statement is later executed.

In certain embodiments, processing the expression includes parsing the expression into one or more nodes. In these and other embodiments, processing the expression further includes determining whether the expression comprises a scalar expression or a tabular expression. Additionally, if the expression comprises a scalar expression, a scalar type deductor is used to deduce the data type of the expression, according to certain embodiments. If, on the other hand, the expression comprises a tabular expression, a table type deductor is used to deduce the data type of the expression, according to these and other embodiments.

The following detailed description and accompanying drawings provide a better understanding of the nature and advantages of the present disclosure.

DETAILED DESCRIPTION

Figure 1:
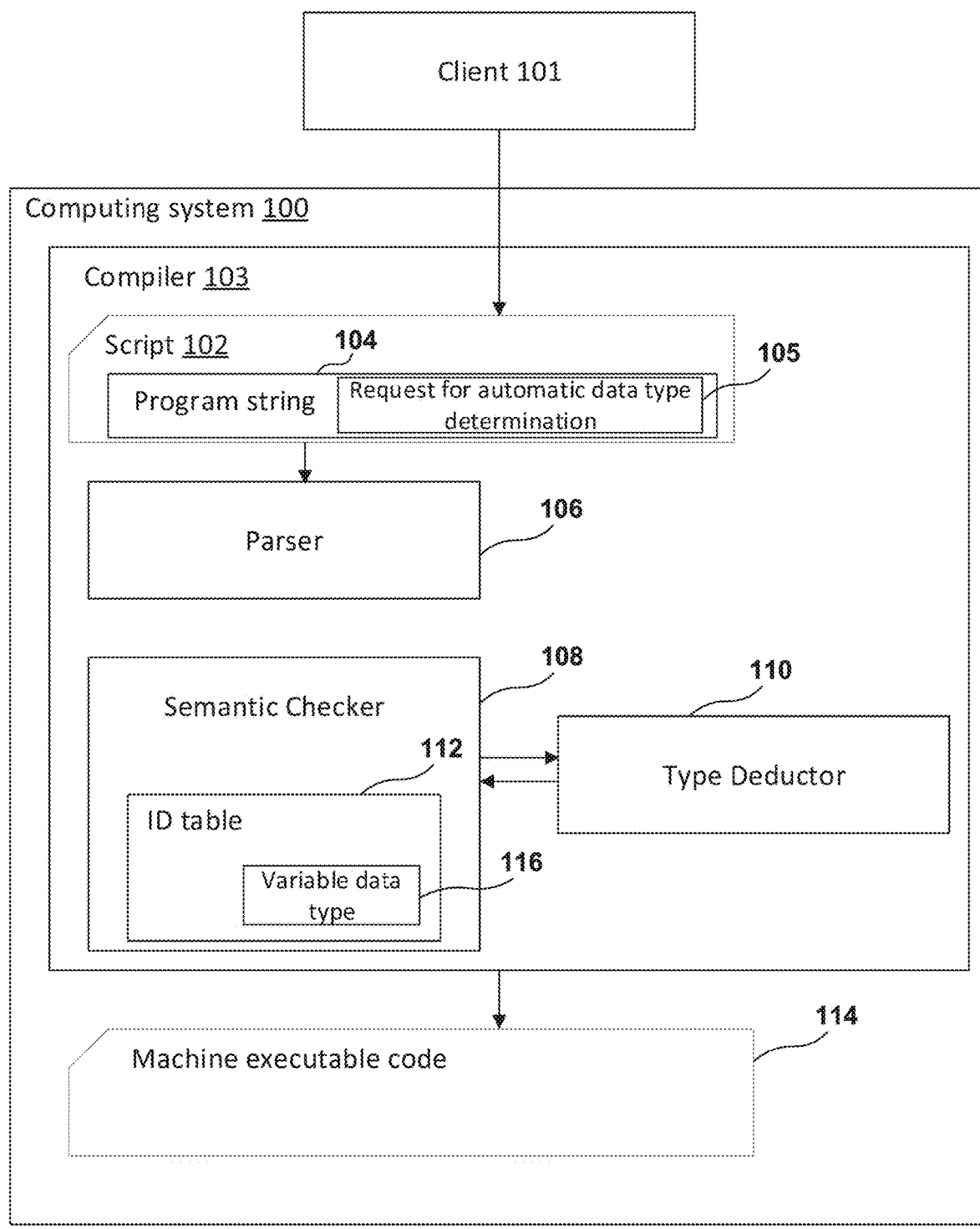
FIG. 1 illustrates a computing system that may be used to perform automatic data type determination of one or more variables, according to one embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Embodiments described herein provide for automatic data type determination of declared variables. Data type information of a variable is required in plan preparation of procedural database objects, such as a procedure or a user-defined function. For example, data type information may be required during semantic checking and during plan optimizations. In some embodiments, the earliest time that type information is required is when semantic checking of read or write occurs on the corresponding variable. Therefore, the data type of any variable should be specified at the semantic checking stage.

In many instances, the programmer must specify a data type of a variable when declaring the variable in the program string. For example, this may be done in the following way in certain programming languages:

declare <variable name> <data type>=<initial value>.

If the initial value is simple, then it may be relatively straightforward to specify the data type of the initial value. For example, if the initial value is '1,' then it may be relatively trivial to specify the data type as an integer. In many instances, however, determination of the data type of the variable may not be trivial. This is because the initial value may comprise a complex expression with one or more operations, scalars, functions, subqueries, conditional statements, etc. Take, for example, the following declaration:

declare <variable name> <data type>=1+b*func(1)+(select c from table).

In this instance, the programmer must keep track of the following: the data type of variable 'b,' the return type of function 'func' with an integer argument, and the data type of column-element 'c' from 'table.' This can result in the substantial effort and time on the part of the programmer to pinpoint the proper data type to specify the variable as.

Consider also the case of declaring a table variable. When a table variable is declared, the data type of each of the columns should be specified. Consider, for example, the following complex variable declaration:

declare var_t TABLE (column 1<data type>, column 2<data type>, column 3<data type>, column 4<data type>) =SELECT . . . FROM . . .

In this case, the programmer must keep track the tables in the FROM clause and the columns to be exposed through the SELECT clause. The FROM clause may contain various JOIN commands (e.g., INNER JOIN, LEFT OUTER JOIN, RIGHT OUTER JOIN, FULL OUTER JOIN, etc.) and conditional statements (e.g., CASE, WHERE, IF THEN, etc.). The SELECT clause may also contain conditional statements. Further, the programmer must keep track of which projection column in the SELECT clause maps to which table column in the FROM clause, which requires tracking the aliases of joined tables. For the case of conditional statements such as CASE, the programmer may also be required to determine the resulting type of the CASE statement that accommodates all optional values. Therefore, the process of manually specifying the data types of columns 1-4 may consume substantial time and effort.

Embodiments described herein provide for automatic data type determination of variables such that the programmer does not need to specify data types for each variable declared. According to the systems and methods and programming languages described herein, the programmer may "defer" specifying a data type of variable when declaring the variable. Instead, the programmer may specify within the declaration statement a request for automatic data type determination by the compiler. In one embodiment, for example, the programming language may allow automated data type determination using the following semantics:

declare <variable name>AUTO=<initial value>.

In the above case, the programmer instructs the compiler or database system to automatically determine the data type of the variable using the semantics "AUTO." As will be described in detail below, the compiler or database system may process the initial value to determine the data type of the variable. In various embodiments, the integrated development environment (IDE) in which the program string is written may recognize the AUTO semantics. In other embodiments, the word 'AUTO' need not be specified. Instead, the programmer can merely leave blank the portion of the declare statement where the data type information may normally be found. For example, systems and methods described herein may perform automatic data type determination on the following statement:

declare <variable name>=<initial value>.

In this example, the compiler may take the lack of a specified data type as the instruction or request to perform automatic data type determination. In other embodiments, other semantics for the request to automatically determine data type may be supported by the programming language and recognized by the compiler.

In any case, the compiler may process the <initial value> to determine the data type that is to be registered with the corresponding variable name. In some embodiments, the semantic checker module of the compiler checks and maintains a set of usable variables as the semantic checker processes each statement in the program. The semantic checker may register a new variable when it comes across a declare statement. In the case of a declare statement in which the variable data type is specified, the semantic checker may register the variable and the specified data type in the set of usable variables. In the case of data type unspecified declaration, the data type of the variable is derived by a data type deductor that communicates with the semantic checker of the compiler. The data type deductor processes the right-hand side expression of the declare statement (e.g., the initial value) to determine the appropriate data type to assign the variable. Once the data type is determined, it is registered with the corresponding variable name in the set of usable variables as if the data type were explicitly specified in the declare statement. As a result, as the semantic checker continues processing the program, it is not aware of the differences between data type-specified and data type-unspecified declarations. Moreover, the plan preparation processes are not aware of the differences between data type-specified declarations and data type-unspecified declarations.

In the embodiments described herein, automatic data type determination achieves several technological benefits. For example, automatic data type determination can prevent programming error when the programmer specifies the wrong data type. For example, if a variable containing a floating-point value is declared as an integer data type by mistake, the floating-point value can be trimmed out. As a result, any subsequent calculations on the variable can be erroneous.

Another technological benefit is the avoidance of unnecessary type conversion. When the data type in the declaration statement and the data type of the actual value in the right-hand side of the statement do not match, the value is converted to the declared data type to comply with the declared data type. These conversions can be expensive. By using the exact type derived from the right-hand side value, these conversions can be avoided. Additionally, when there is a need to update data models (e.g., add a new column to a table, change a column type of a table, etc.), related application models that access the data model also need to be updated. If variable data types in the application model are determined automatically by the system based on the changed data model, updates on application model can be avoided.

FIG. 1 illustrates a computing system 100 that may be used to perform automatic data type determination of one or more variables, according to one embodiment. The computing system 100 may be part of a database system, for example. In the embodiment shown, the automatic data type determination is implemented by a compiler 103 of the computing system at compile-time. However, automatic data type determination may be implemented at other times as well. In the illustrated embodiment, a script 102 may be written on a client device 101 by a user, for example, in an integrated development environment (IDE). The script 102 may be written in any scripting language. However, for purposes of explanation, the script 102 may be referred to herein as a form of database procedural language such as SQL script. The script 102 may be a single query or it may be part of a procedure program.

In any case, the script 102 includes at least one program string 104 that comprises a variable and an expression to which the variable is set (e.g., in a declare statement). The program string 104 is also shown to include a request for automatic data type determination 105. In some embodiments, the request for automatic data type determination 105 may be explicit, e.g., by using semantics indicating the request (e.g., 'AUTO'). In other embodiments, the request for automatic data type determination 105 may be implicit in the declare statement such as when neither the data type nor the semantics is specified. In either case, the variable data type is not specified within the program string 104.

The script 102 is shown to be received by a compiler 103 of the computing system 100. The compiler 103 is responsible for converting the script 102 into machine executable code 114, for example. The script 102, for example, may be high-level code while the machine executable code 114 may be lower level language that forms part of an executable program. In any case, the program string 104 is parsed by the parser 106 into a parse tree. Next, the output of the parser 106 is processed by the semantic checker 108, for example. In certain embodiments, the semantic checker 108 verifies that keywords, object names, operators, and so on are properly placed within the program string 104. For example, the semantic checker 108 may detect semantic errors within the script 102. Additionally, the semantic checker 108 maintains an ID table 112 as it processes the script 102. The ID table 112 may be a symbol table that holds a list of variable names and their respective properties. If the program string 104 included a specified data type for a declared variable, then the name of the variable and the specified data type may be registered in the ID table 112. On the other hand, if the data type of the variable is not specified, the semantic checker 108 may detect that the data type of the variable should be automatically determined. For example, the semantic checker 108 may detect the semantic of "AUTO" or it may simply detect the absence of a specified data type.

When the semantic checker 108 determines that the data type of a variable should be automatically determined, it communicates with the type deductor 110 to have the type deductor 110 determine the data type of the variable. In some embodiments, the semantic checker 108 may pass the output of the parser 106 to the type deductor 110, including the parse tree and any intermediate data obtained by the parser 106. For example, the parser 106 may have determined the type of certain literals in the program string as part of the parsing process. The type deductor 110 then determines the data type of the variable and returns the data type to the semantic checker for registration of the variable with the automatically determined data type 116 in the ID table 112. The compiler 103 then produces machine executable code 114 based on the variable and the assigned data type for the variable.

Figure 2:
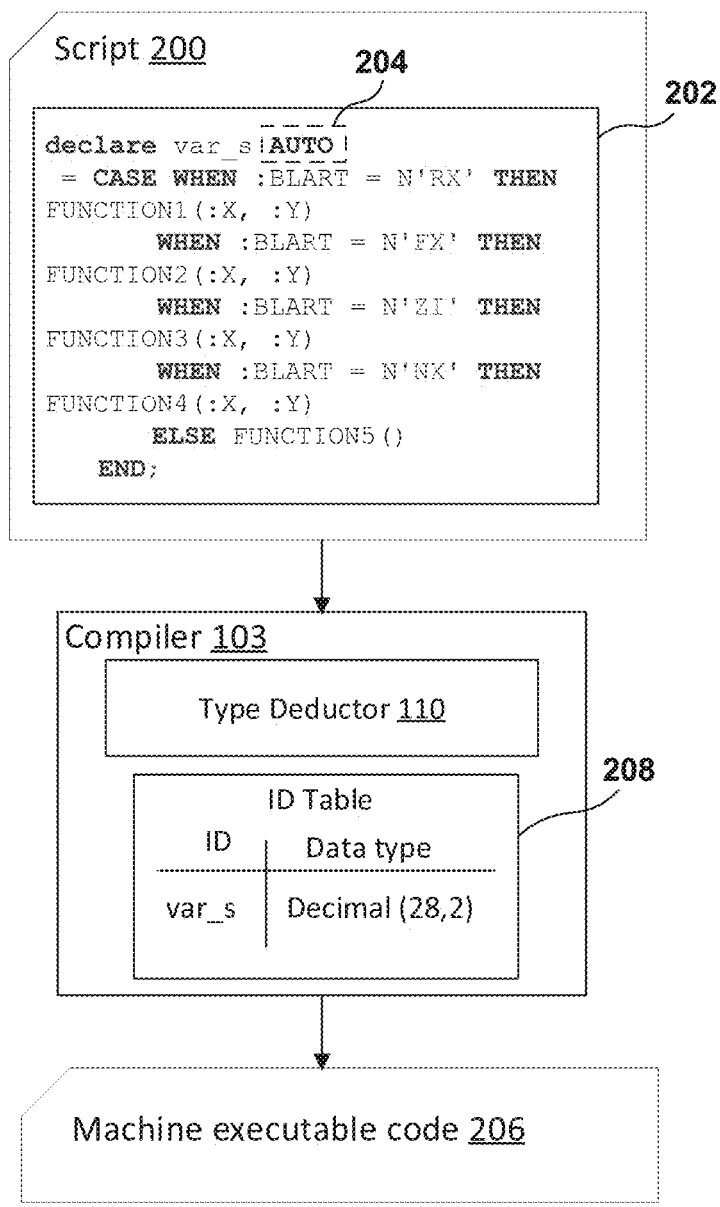
FIG. 2 shows an example program string where the data type of a variable is unspecified, according to one embodiment.

FIG. 2 shows an example program string 202 where the data type of a variable is unspecified, according to one embodiment. In the embodiment shown in FIG. 2, script 200 includes a program string 202 that declares var_s as a CASE statement. Without automatic data type determination, the programmer who wrote the program string may have had to go through each of the four conditional WHEN-THEN clauses and the ELSE clause to find a data type that can accommodate each of the return results of those clauses. In the example shown, the programmer may have needed to find the data type that is compatible with each of FUNC-TION1(:X, :Y), FUNCTION2(:X, :Y), FUNCTION3(:X, :Y), FUNCTION4(:X, :Y), and FUNCTION5( ). This, of course, requires time and effort on the part of the programmer.

In the embodiment shown, however, the programmer has coded the keyword 204 of 'AUTO' where the data type may normally be specified. In the embodiment shown, keyword 204 of 'AUTO' acts as a request for automatic data type determination at the compiler 103. As noted above, the keyword 204 can be any word, so long as the compiler recognizes the keyword 204 as the request for automatic data type determination. In certain other embodiments, the keyword 204 may be a blank field. The compiler may be configured to recognize the lack of a specified data type as itself a request to perform automatic data type determination.

In the embodiment shown, the compiler 103 processes the program string 202 and detects the presence of the keyword 204 'AUTO.' For example, the semantic checker of compiler 103 may recognize the keyword 204 'AUTO' and have the type deductor 110 perform automatic data type determination on the expression in the right-hand side of the program string 202. In the embodiment shown, the type deductor 110 may iterate through each of the conditional statements and find the data type that accommodates each of FUNCTION1 (:X, :Y), FUNCTION2(:X, :Y), FUNCTION3(:X, :Y), FUNCTION4(:X, :Y), and FUNCTION5( ), for example. In this example, the type deductor may deduce that the proper data type is decimal (28, 2). Next, the type deductor 110 may return the automatically determined data type to the semantic checker so that the semantic checker can register the var_s with the automatically determined data type in ID table 208, for example. The compiler 103 then uses the ID table 208 to generate machine executable code 206 based on the variable and the automatically determined data type for the variable as though the data type was explicitly specified in program string 202.

Figure 3:
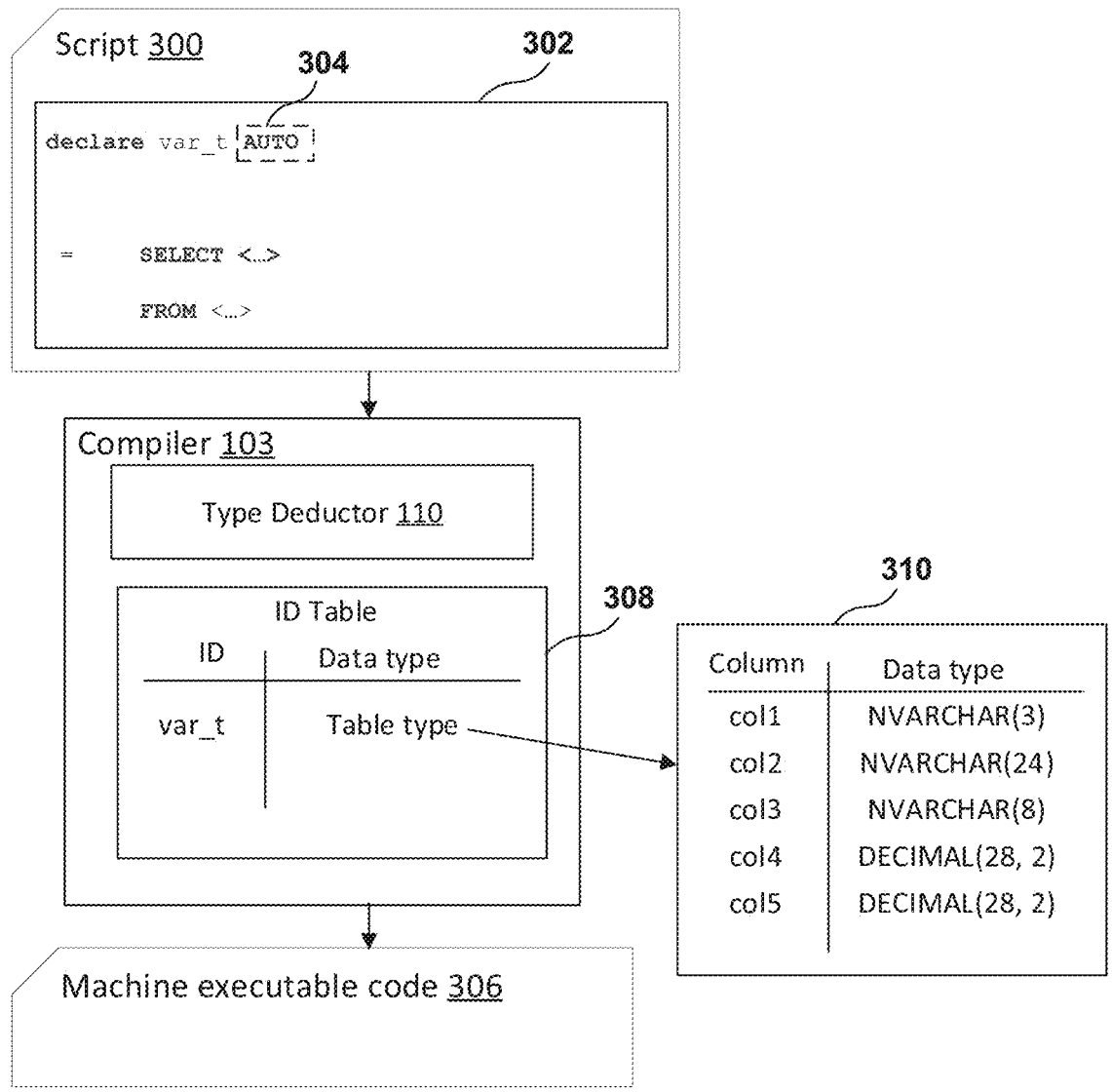
FIG. 3 shows an additional embodiment of a program string that declares a variable without specifying the data type of that variable, according to one embodiment.

FIG. 3 shows an additional embodiment of a program string 302 that declares a variable without specifying the data type of that variable, according to one embodiment. In the example shown, the variable var_t is a table variable. The right-hand side of the program string 302 has a SELECT clause and a FROM clause. In various embodiments, the FROM clause specifies the one or more tables from which rowsets are selected. The FROM clause may include one or more JOIN statements used to combine rows from two or more tables, for example. The SELECT clause within the SELECT statement specifies one or more columns from the table to include in the result set. The SELECT clause may contain one or more conditional statements (e.g., CASE statements).

With automatic data type determination, the programmer has coded the keyword 304 of 'AUTO' where the table having the column names and respective data types may normally be specified. In the embodiment shown, the keyword 304 is semantically recognized as a request for automatic data type determination of the table. For example, the keyword 304 here acts as a request for both the column names of the columns of a table specified in the SELECT clause and the respective data types of those columns.

In response to the detecting keyword 304, the compiler 103 employs the type deductor 110 to automatically determine both the column names and the associated data types of table variable var_t. In the example shown, the type deductor 110 may process the FROM clause to determine the tables to be operated on. In some embodiments, the type deductor 110 builds an internal type map with the column names or aliases and the associated data type for each column in the tables specified in the FROM clause.

In certain embodiments, the FROM clause may include a tabular database object such as a table or view, a table variable as described above, or a subquery having a SELECT statement. For the tabular database object such as the table or view, the type deductor 110 (e.g., the table type deductor 402 of FIG. 4) may look up the data type of the database objects as specified in metadata (e.g., column specification) for the database object, for example. In certain embodiments, the metadata may be stored in a catalog associated with the database system and with which the type deductor 110 communicates. In some embodiments, the type deductor 110 may look up the column name and respective data type for each of the columns of the database object. The type deductor 110 may then enter each of the looked up column names and respective data type into the internal type map, for example.

In various embodiments, when the FROM clause includes a table variable, the type deductor 110 may look up the data type for the table variable in an ID table that is maintained by the compiler 103. In various embodiments, the ID table stores data types for the table variable as a table type, which can be described as pairs of column names and types of a table. For example, a table comprising a column "NAME" that can store character data up to 255 characters and a column "ADDRESS" that can store character data up to 5000 characters may have a table type of {"NAME": "NVARCHAR(255)", "ADDRESS": "NVARCHAR(5000)"}. In such an example, the table type for the table is stored in the ID table. The type deductor 110 then enters the table type information (e.g., one or more column names and respective data types) into the internal type map. In various embodiments, when the FROM clause includes a subquery, the type deductor 110 may be recursively called for the subquery. For example, when the type deductor 110 encounters a subquery, the compiler 103 may implement the type deductor 110 recursively to deduce the type of the subquery. The type deductor 110 may then obtain one or more column names and respective data types from the subquery, which it subsequently enters into the internal type map.

In various embodiments, the type deductor 110 next processes the SELECT clause. The SELECT clause is generally used to select data (e.g., particular columns) from the set of data specified in the FROM clause. The type deductor 110 determines from the SELECT clause which entries from the internal type map are retrieved and registered to the table type 310 of var_t in the ID table 308, for example. If, for example, the SELECT clause comprises a wildcard semantic (e.g., '*'), then the type deductor may retrieve each of the column names and respective data types from the internal type table and register those columns names with the respective data type in the table type 310 of var_t in the ID table 308. If, on the other hand, only a subset of the columns is specified in the SELECT clause, then the type deductor 110 may retrieve the specified column names and respective data types for registration in table type 310 of var_t in ID table 308. In either case, the compiler 103 uses the automatically determined table type 310 of var_t to generate machine executable code 306 as though the table type 310 were explicitly specified in program string 302.

Figure 4:
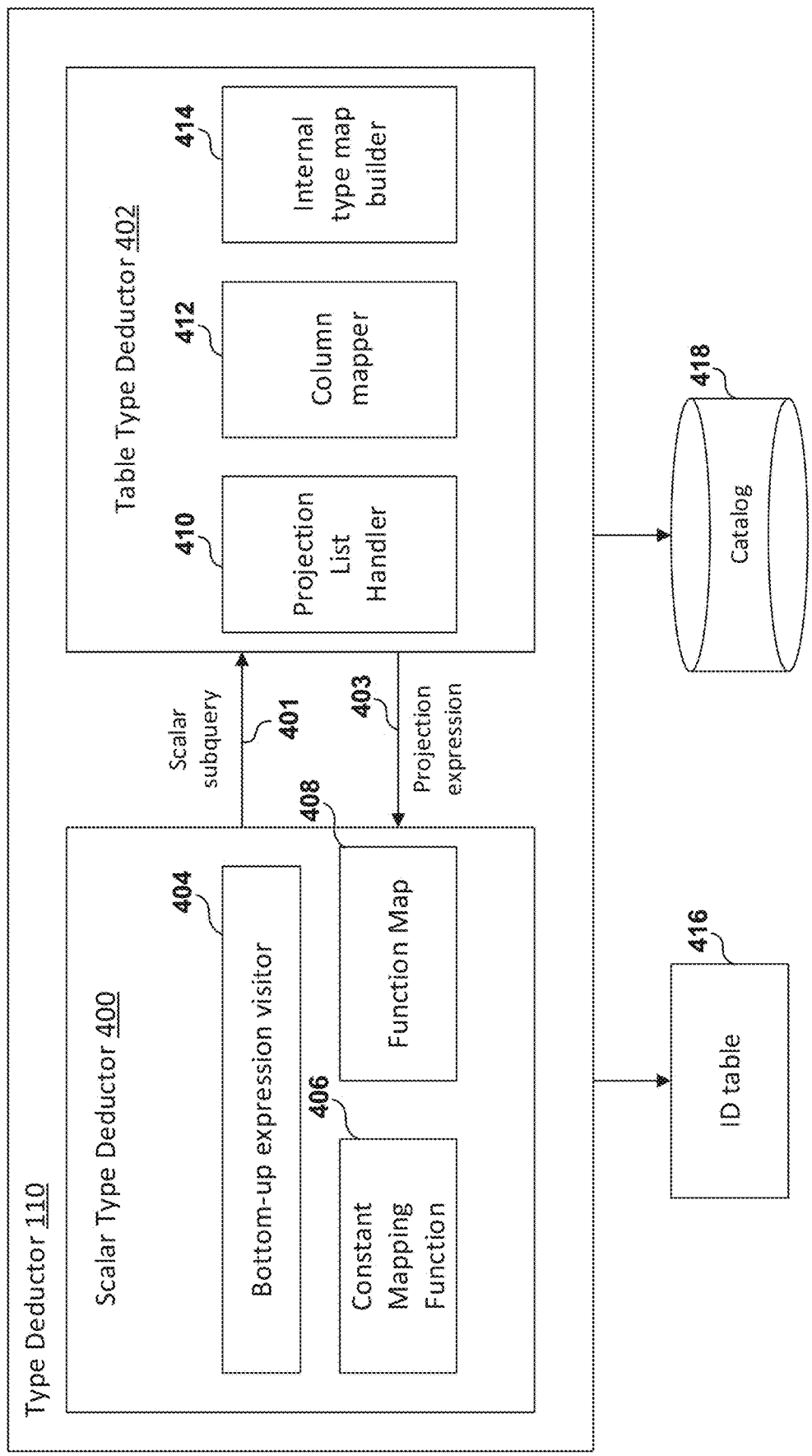
FIG. 4 illustrates various components of a type deductor used for automatic data type determination of a variable, according to some embodiments.

FIG. 4 illustrates various components of a type deductor 110 used for automatic data type determination of a variable, according to some embodiments. The type deductor 110 is shown to include a scalar type deductor 400 and a table type deductor 402. In certain embodiments, the initial value of the variable is categorized into either a scalar expression or a tabular expression based on whether the expression includes a SELECT statement that is not part of a scalar subquery. For example, if the expression includes a SELECT statement that is not part of a scalar subquery, the initial value of the variable is categorized as a tabular expression. Otherwise, it is categorized is as a scalar expression. If the initial value is a scalar expression, the scalar type deductor 400 is configured to process the expression to determine its data type. If the initial value is a tabular expression, the table type deductor 402 is configured to determine the expression's data type.

As noted above, if the expression is a scalar expression, the scalar type deductor 400 is used to process the scalar expression. The scalar type deductor 400 is shown to include a bottom-up expression visitor 404, a constant mapping function 406, and a function map 408. In various embodiments, the bottom-up expression visitor 404 initially accesses the leaf nodes of the parse tree produced by the parser of the compiler. The leaf nodes of the parse tree may comprise a constant (e.g., 1, 1.1, or string), a variable, a function, or a subquery. These various node types may be identified by the parser. The bottom-up expression visitor 404 is configured to begin at a leaf node and sequentially move up in the parse tree.

According to various embodiments, if a node is identified as a constant, the constant mapping function 406 is used to determine the data type of the constant. For example, if the constant is '1,' the constant mapping function 406 logically maps the constant to the integer data type. In certain embodiments, if the node is a variable, the scalar type deductor 400 looks up the data type of the variable in the ID table 416. As noted above, the ID table 416 may be maintained by the semantic checker of the compiler. In some embodiments, ID table 416 can be ID table 112 shown in FIG. 1. In certain embodiments, if the node is a function, a function map 408 is used to determine the data type of the node. In these embodiments, the function map 408 looks up the function and its argument types in a function table. Based upon the argument data types (e.g., which may be determined by the constant mapping function 406, for example), the function map 408 finds the entry corresponding to the function name and the argument data type within the function table.

According to various embodiments, if the scalar expression processed by the scalar type deductor 400 includes a subquery (e.g., select c from table), the scalar type deductor 400 sends the scalar subquery 401 to the table type deductor 402, since the table type deductor 402 is configured to handle tabular expressions such as the subquery.

As noted above, if the expression is a tabular expression, the table type deductor 402 is used. The table type deductor 402 is shown to include a projection list handler 410, a column mapper 412, and an internal type map builder 414. The internal type map builder 414 is responsible for processing the FROM clause to build the internal type map of each of the columns in the table specified in the FROM clause. The projection list handler 410 processes the SELECT clause into a list of one or more column-like elements, for example. The column-like element may include a column name and a scalar expression (e.g., column 1+2). The scalar expression itself may include a function, a scalar, or a variable. In case the column-like element contains a scalar expression, the table type deductor 402 sends projection expression 403 (along with the scalar expression) to the scalar type deductor 400, since the scalar type deductor 400 is adapted for handling scalar expressions. In various embodiments, the column mapper 412 is responsible for mapping the column name as specified in the SELECT clause to the data type held in the internal type map.

In various embodiments, the table type deductor 402 begins by using the internal type map builder 414 to scan the FROM clause to generate the internal type map. Next, the table type deductor 402 uses the projection list handler 410 to scan the project list in the SELECT clause, for example, for determining the data type of the column like elements of the projection list. In certain embodiments, the projection list handler 410 requests the column mapper 412 to retrieve data types for columns specified in the SELECT clause from the internal type map. For example, if the projection includes a column-like element "column1," the projection list handler 410 sends a request to column mapper 412 to retrieve the data type of "column1" as assigned in the internal type map by the internal type map builder 414. In some embodiments, the internal type map is sent to or built in the column mapper 412 so that the column mapper 412 may respond to the request with the requested data type. In other embodiments, the internal type map is maintained in the internal type map builder 414 while the column mapper 412 retrieves the data types requested of it from the internal type map builder 414.

Figure 5:
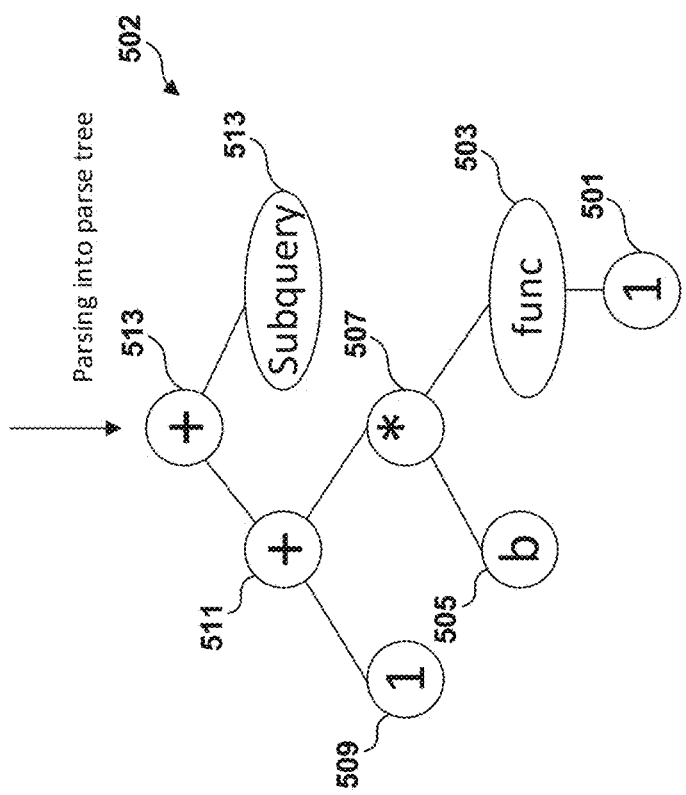
FIG. 5 illustrates the parser having parsed a declare statement expression into a parse tree into nodes, according to some embodiments.

FIG. 5 illustrates the parser 106 having parsed a declare statement 500 expression into a parse tree 502 having various nodes 501-513, according to some embodiments. In various embodiments, the bottom-up expression visitor 404 begins processing the leaf nodes and works its way up. Thus, in the example shown, the bottom-up expression visitor 404 may begin with node 501. Next, the scalar type deductor 501 determines a node type of node 501. As noted above, the node type of various nodes may be a constant (e.g., '1,' '1.1,' 'string,' 'TRUE' etc.), a variable (e.g., 'b,' ':x,' etc.), a function (e.g., 'func( ),' '+,' '*,' etc.), or a subquery (e.g., 'select c from table'). Depending on the node type, the scalar type deductor 400 may use the constant mapping function 406, a variable table such as ID table 416, a function table such as that stored in catalog 418, or the table type deductor 402, respectively, to obtain or deduce the data type of the node.

In the example shown, the scalar type deductor 400 identifies that node 501 is a constant and therefore uses the constant mapping function 406 to deduce that node 501 is an integer. Subsequently, the bottom-up expression visitor 404 visits node 503, which is a function named 'func' having an argument of '1.' 'func' may be a built-in function or a user-defined function. In either case, the function is looked up in a function table. Since the data type of function's argument is known to be an integer, the data type within the entry corresponding to the function name 'func' and argument 'integer' is retrieved from the function table. Next, the bottom-up expression visitor 404 may visit node 505, which is variable 'b.' As a result, the data type of variable 'b' may be retrieved from a variable table such as ID table 416, for example. According to the embodiment shown, the bottom-up expression visitor 404 visits node 507. For node 507, the scalar type deductor 400 may find the data type associated with the multiplication function having arguments with the data types of node 503 and 505. This, for example, may be done by using a function table such as function table 618 shown in FIG. 6, according to some embodiments. For example, if nodes 503 and 505 are both integers, then their product may be an integer. Therefore, node 507 may be determined to have a data type of an integer. The bottom-up expression visitor 404 may continue in this bottom-up fashion until the data type of the root node is determined, for example. In the example shown, the data type of variable 'a' may thus be determined to be the data type of node 513.

Figure 6:
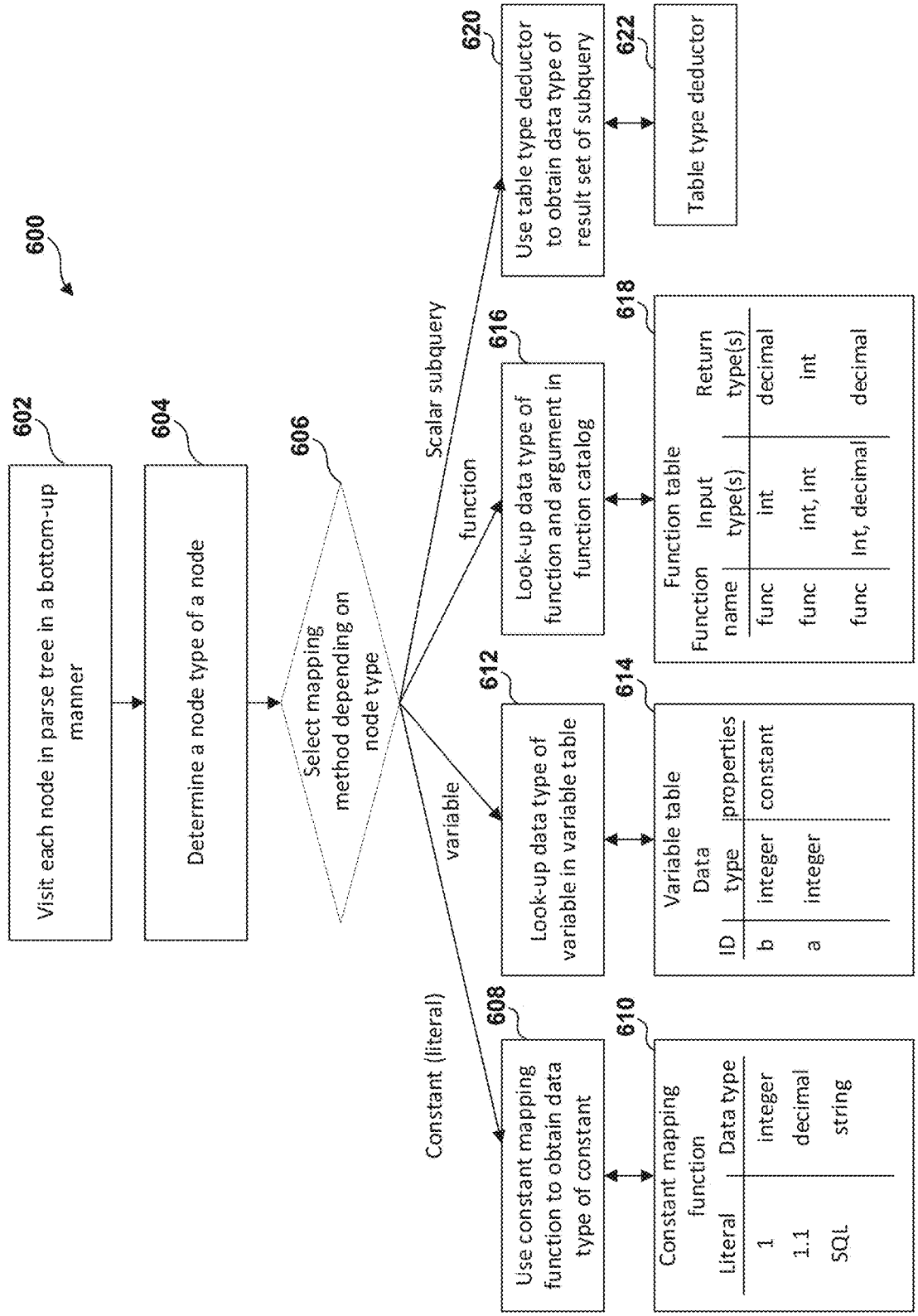
FIG. 6 illustrates a method used to determine the data type of each node in a parse tree, according to certain embodiments.

FIG. 6 illustrates a method 600 used to determine the data type of each node in a parse tree, according to certain embodiments. The method 600 begins at block 602 by visiting each node in the parse tree in a bottom-up manner. At block 604, the node type of a particular node is determined 604. At decision 606, a mapping method is selected based on the node type determined at block 604. For example, if the node type of a particular node is determined to be a constant, then method 600 proceeds to block 608, at which a constant mapping function is used to obtain the data type of the constant. In the example shown, constant mapping function 610 logically represents how literals are mapped to data types. For example, the literal '1' is mapped to integer, '1.1' to decimal, and 'SQL' to string. The following table illustrates certain additional examples of literal expressions and their corresponding derived data types.

| Expression | Derived data type | Note |
| --- | --- | --- |
| 'string' | VARCHAR(6) | |
| N'string' | NVARCHAR(6) | |
| X'ABCD' | VARBINARY(2) | |
| TRUE | BOOLEAN | |
| FALSE | | |
| 1 | INT | Between −2,147,483,648 and 2,147,483,647 |
| 2147483648 | BIGINT | Between −9,223,372,036,854,775,808 and 9,223,372,036,854,775,807 |
| 9223372036854775808 | DECIMAL | Floating-point decimal number may be used |
| 1.2 | | |
| 1.2e1 | | |
| 1.234e40 | | |
| CAST(1 as TINYINT) | TINYINT | |

In certain embodiments, an adjustment to the derived data type can be made after declaration of the variable. For example, if the derived data type of the variable exactly matches the initial expression, embodiments described herein may add a final adjustment so that the derived data type is changed to a representative data type of each data type category. For example, assume a program string reads as follows:

declare a=' ';
    if <cond1> then a='ZI';
    else a='RX';

According to various embodiments, the type deductor may initially assign VARCHAR(1) to variable a based on the declaration statement initializing the variable to an empty string. The next two lines of the statement, however, assign a two-character string to the variable. In these cases, the type deductor may adjust the data type from VARCHAR(1) to VARCHAR(2) because it knows that the variable will be assigned a two-character string after initialization.

In various embodiments, the constant mapping function 610 may analyze the American Standard Code for Information Interchange (ASCII) code of the expression to determine the data type of the constant. In various embodiments, the expression is text that is encoded using a character encoding standard such as ASCII. For example, if the constant is '1,' then the text of '1' has a corresponding ASCII code that represents '1.' The constant mapping function 610 may read the ASCII code of '1' and look at whether the corresponding ASCII code is within the number range. If it is, then the constant mapping function 610 may deduce that '1' is an integer.

According to the embodiment shown, if the node is a variable, the method 600 proceeds to block 612, where the data type of the variable is looked up in variable table 614 (e.g., the ID table 416). In the embodiment shown, when the node is a function, the method 600 proceeds to block 616, where the data the function name along with the data type(s) of its argument(s) are looked up in function table 618. For example, if the node is a function named lune with an integer and a decimal as its argument, block 616 may return decimal as the data type from the function table 618. Additionally, if the node is determined to be a subquery, the method 600 proceeds to block 620 where the table type deductor 622 is used to obtain the data type of the result set of the subquery.

Figure 7:
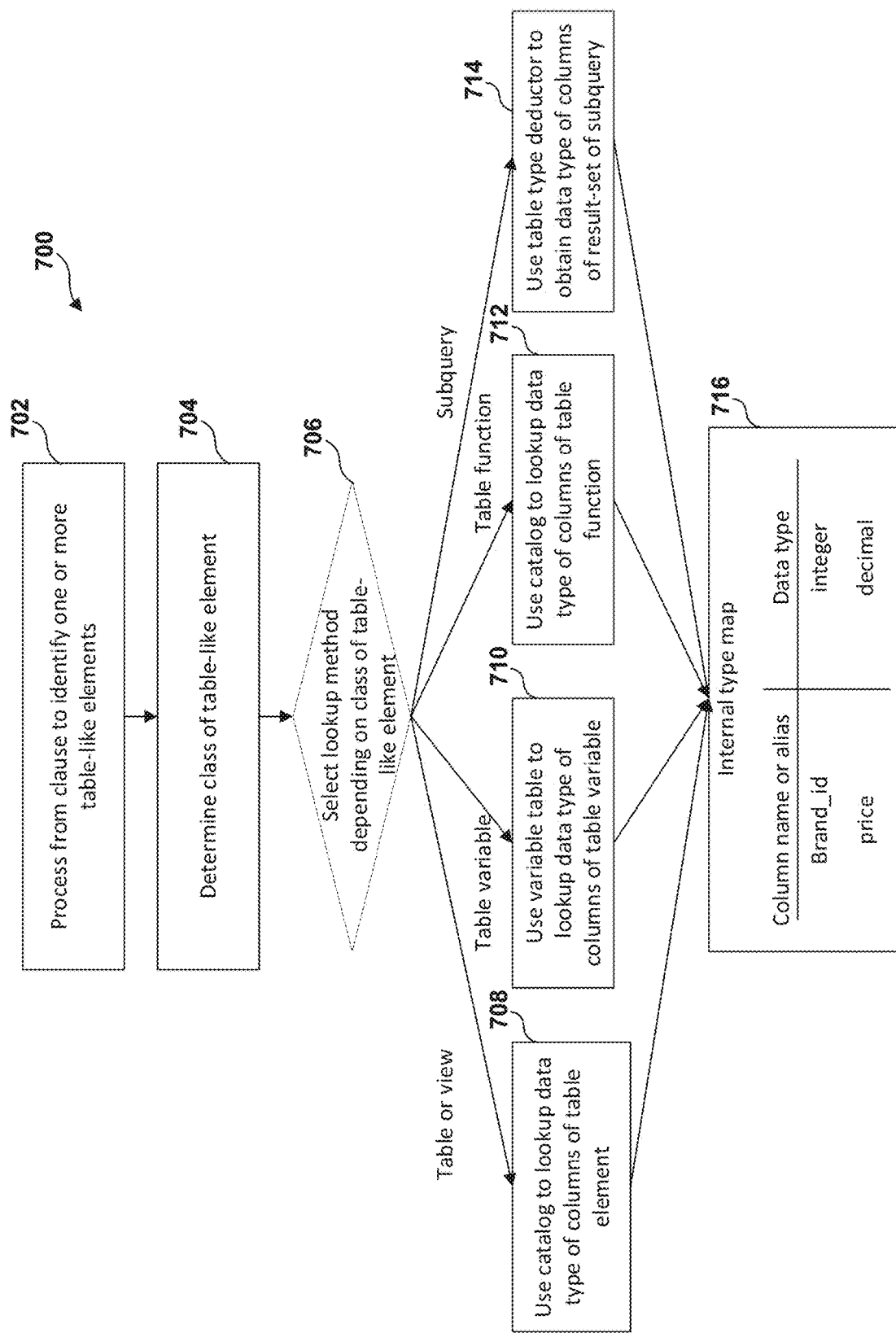
FIG. 7 illustrates a method used for processing the FROM clause of a tabular expression, according to various embodiments.

FIG. 7 illustrates a method 700 used for processing the FROM clause of a tabular expression, according to various embodiments. At block 702, the method processes the FROM clause to identify one or more table-like elements. The table-like elements may include, for example, a tabular database object such as a table or view, a table variable, a table function, or a subquery. The class of each of the table-like elements in the tabular expression is determined at block 704 and the data type look-up method of each of the table-like elements is selected based on the class determined at block 706. For example, if the class of the table-like element is determined to be a table or view, the method 700 proceeds to block 708 for using a catalog to look-up the data type of the columns of the table or view. The column names and associated data types are then entered into the internal type map 716, which holds column names or aliases along with their respective data types.

In various embodiments, if the table-like element is determined to be a table variable, the method 700 proceeds to block 710. At block 710, a variable table is used to lookup the data types of the columns in the table variable. The method 700 then enters the looked-up column names and respective data types in the internal type map 716. According to the embodiment shown, if the table-like element is determined to be a table function, the data type of the columns of the table function are looked-up in a catalog at block 712. In various embodiments, the data types of columns of a table function are stored in a table function table in the catalog. In these embodiments, the table function table includes a return data type information for each table function. The method 700 then enters the looked-up column names and respective data types in the internal type map 716. In the embodiment shown, if the table-like element is determined to be a subquery, the table type deductor is recursively called for the subquery to obtain the data type of the columns of the result-set of the subquery at block 714. Accordingly, the method 700 then enters the deduced data types of the subquery and the corresponding column names into the internal type map. In the embodiment shown, the internal type map 716 now has entries for each of the columns that are specified in the FROM clause.

Figure 8:
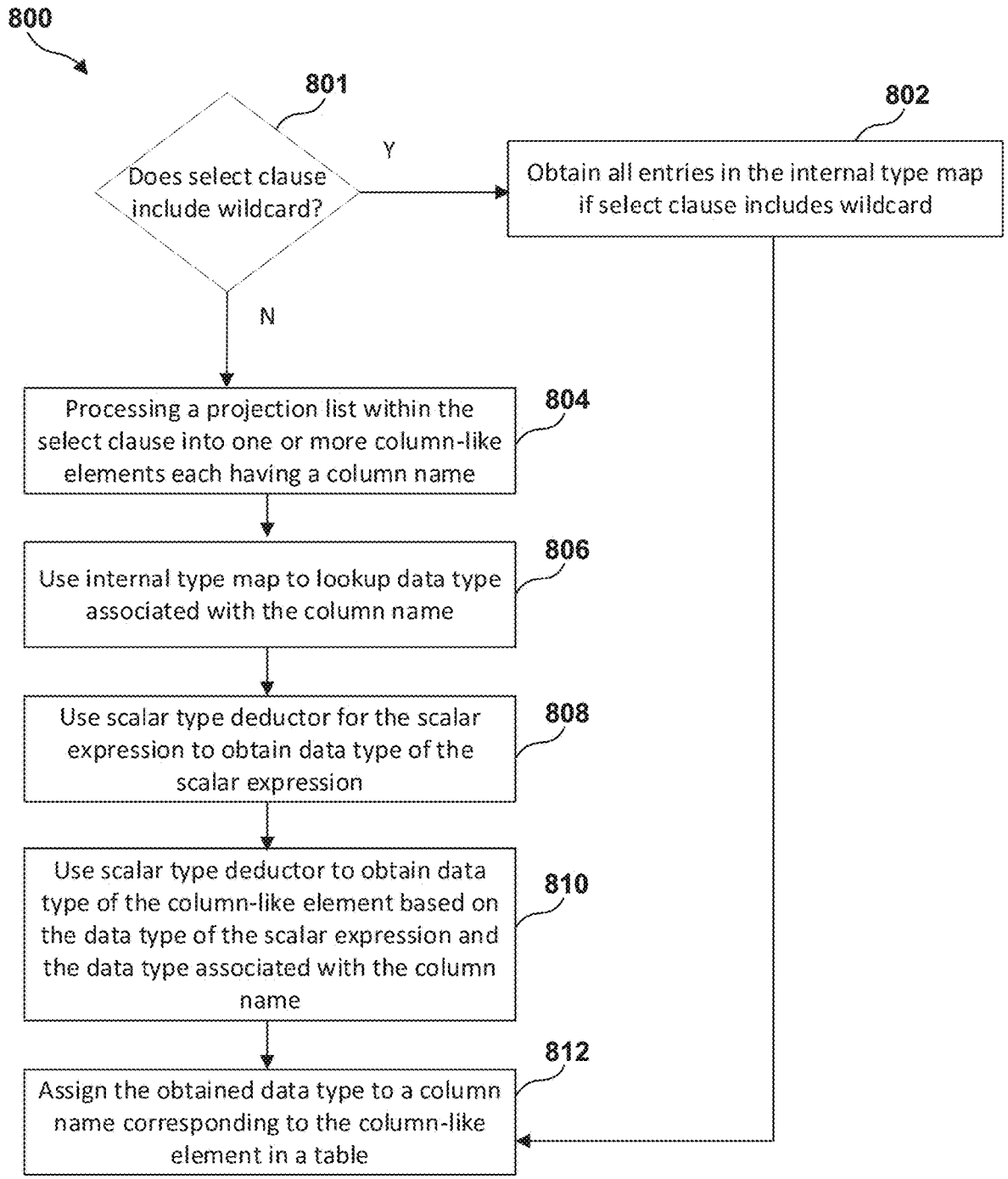
FIG. 8 illustrates a method for processing a SELECT clause in a tabular expression, according to some embodiments.

FIG. 8 illustrates a method 800 for processing a SELECT clause in a tabular expression, according to some embodiments. In the embodiment shown, the method determines at decision 801 whether the SELECT clause includes a wildcard (e.g., '*'). If so, the method 800 may retrieve every column and data type from the internal type map 716 to be assigned to the variable at block 812. If it is determined that the SELECT clause does not include a wildcard at decision 801, the method may proceed to block 804 where the projection list within the SELECT clause is processed into one or more column-like elements. For example, if the projection list is 'col1, col2+4,' block 804 may process the statement into two column-like elements, 'col1' and 'col2+4.'

According to the embodiment shown, the method 800 next proceeds to block 806 where the data type associated with the column name is retrieved from the internal type map 716. For example, block 806 may look up the data type associate with coil and col2 in the internal type map 716 according to this example. Next, if the column-like expression includes a scalar expression, block 808 uses the scalar type deductor to determine the data type of the scalar expression. For example, block 808 may determine that '4' is an integer. Next, block 810 determines the data type of the column like expression based on the data type of the scalar expression and the data type associated with the column name. For example, block 810 may determine that the column-like element 'col2+4' has a data type of integer when both col2 and 4 have a data type of integer. According to the embodiment shown, block 812 then assigns the obtained data type of the column-like expression to a column name corresponding to the column-like element in a table. For example, 'col1' may be assigned a data type of decimal while 'col2+4' may be assigned a data type of integer within the table.

Figure 9:
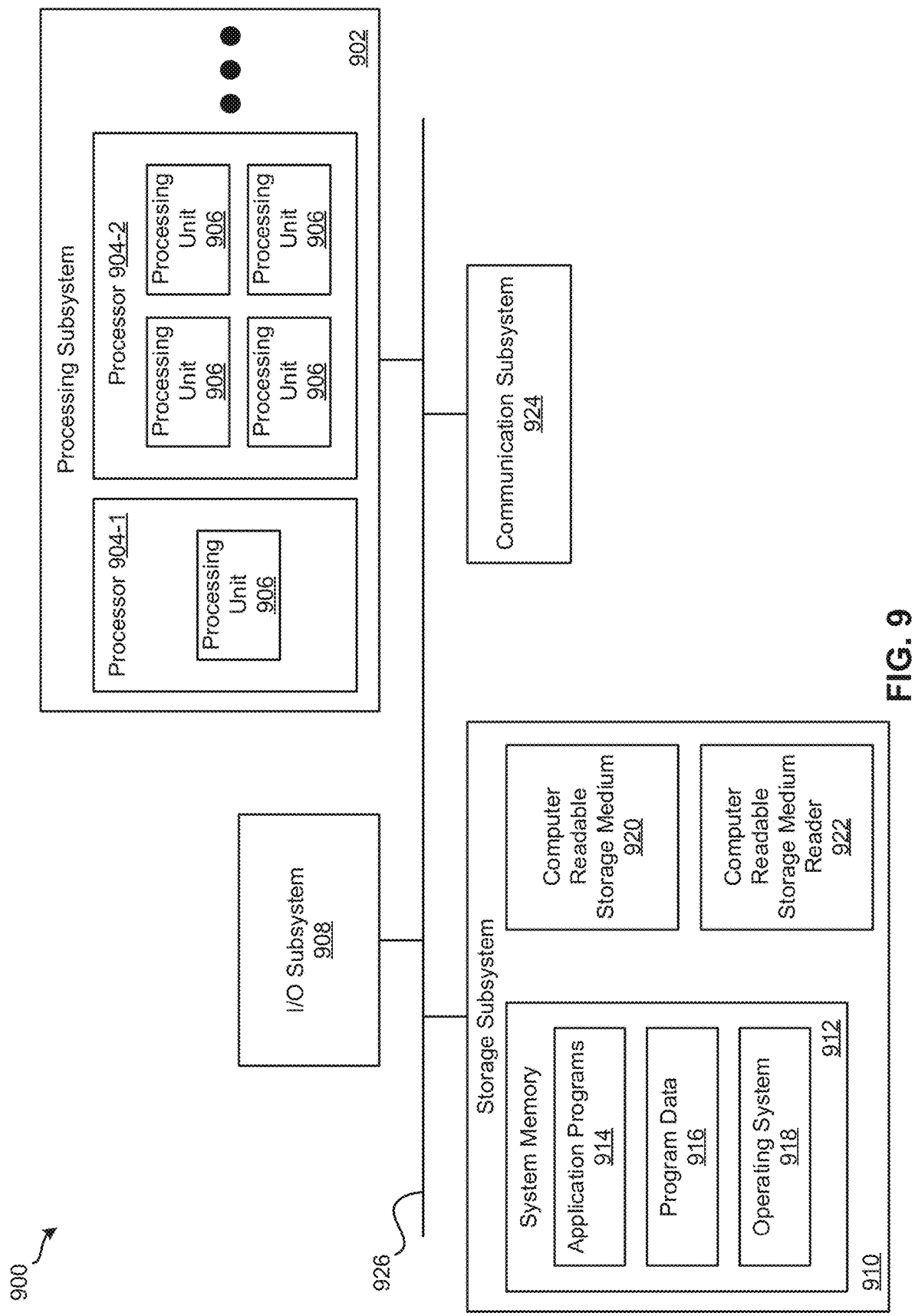
FIG. 9 illustrates an exemplary computer system, in which various embodiments may be implemented.

FIG. 9 illustrates an exemplary computer system 900 for implementing various embodiments described above. For example, computer system 900 may be used to implement client device 101, computing system 100, and computing systems used for implementing compiler 103. Computer system 900 may be a desktop computer, a laptop, a server computer, or any other type of computer system or combination thereof. Some or all elements of parser 106, semantic checker 108, and type deductor 110, or combinations thereof can be included or implemented in computer system 900. In addition, computer system 900 can implement many of the operations, methods, and/or processes described above (e.g., methods 600, 700, 800). As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrate into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities, such as the functionalities described above by reference to methods 600, 700, 800, etc.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914, program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components (e.g., parser 106, semantic checker 108, and type deductor 110) and/or processes (e.g., methods 600, 700, and 800) described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920. Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
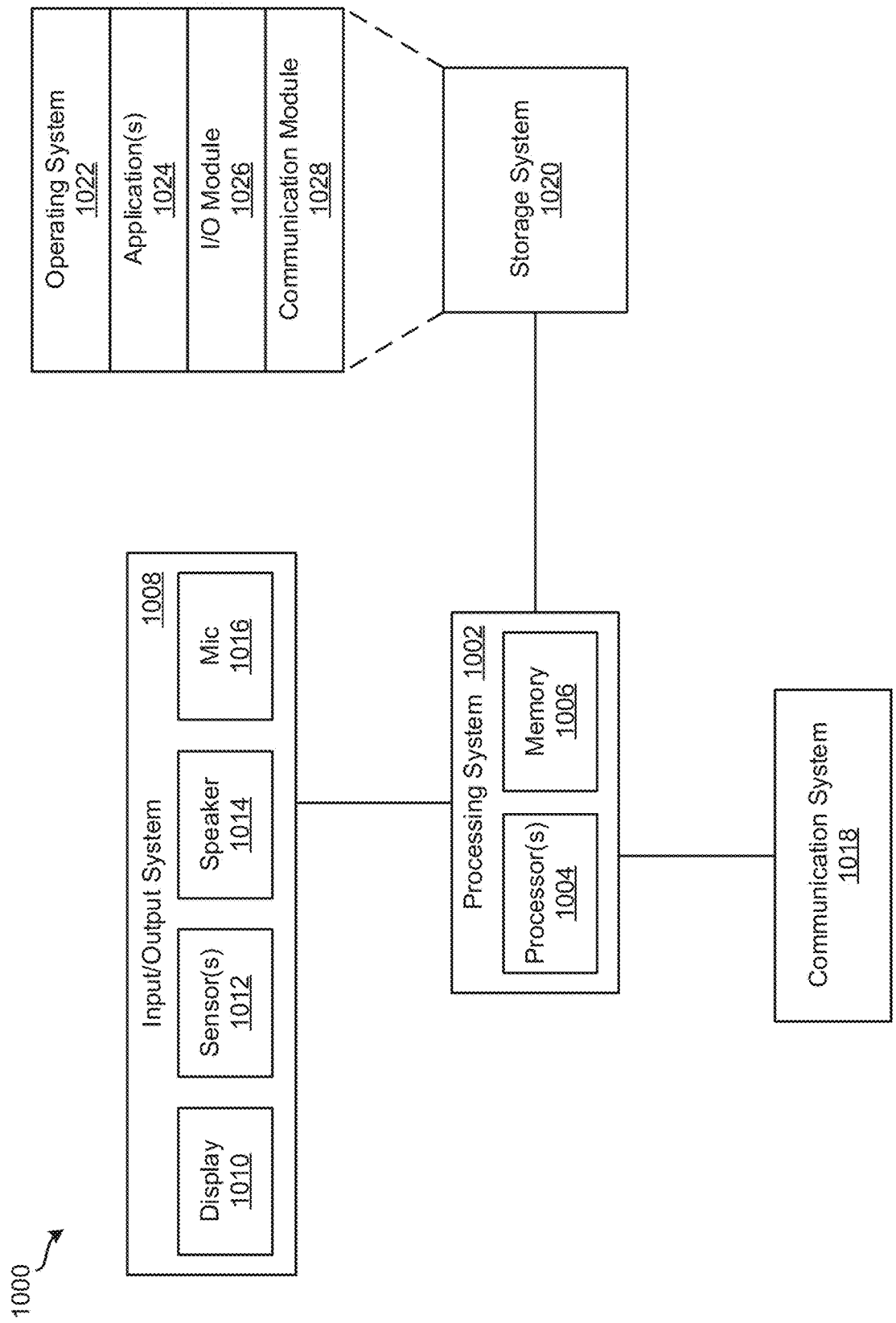
FIG. 10 illustrates an exemplary computing device, in which various embodiments may be implemented.

FIG. 10 illustrates an exemplary computing device 1000 for implementing various embodiments described above. For example, computing device 1000 may be used to implement client device 101. Computing device 1000 may be a cellphone, a smartphone, a wearable device, an activity tracker or manager, a tablet, a personal digital assistant (PDA), a media player, or any other type of mobile computing device or combination thereof. As shown in FIG. 10, computing device 1000 includes processing system 1002, input/output (I/O) system 1008, communication system 1018, and storage system 1020. These components may be coupled by one or more communication buses or signal lines.

Processing system 1002, which can be implemented as one or more integrated circuits (e.g., a conventional microprocessor or microcontroller), controls the operation of computing device 1000. As shown, processing system 1002 includes one or more processors 1004 and memory 1006. Processors 1004 are configured to run or execute various software and/or sets of instructions stored in memory 1006 to perform various functions for computing device 1000 and to process data.

Each processor of processors 1004 may include one processing unit (e.g., a single core processor) or several processing units (e.g., a multicore processor). In some embodiments, processors 1004 of processing system 1002 may be implemented as independent processors while, in other embodiments, processors 1004 of processing system 1002 may be implemented as multiple processors integrate into a single chip. Still, in some embodiments, processors 1004 of processing system 1002 may be implemented as a combination of independent processors and multiple processors integrated into a single chip.

Memory 1006 may be configured to receive and store software (e.g., operating system 1022, applications 1024, I/O module 1026, communication module 1028, etc. from storage system 1020) in the form of program instructions that are loadable and executable by processors 1004 as well as data generated during the execution of program instructions. In some embodiments, memory 1006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1008 is responsible for receiving input through various components and providing output through various components. As shown for this example, I/O system 1008 includes display 1010, one or more sensors 1012, speaker 1014, and microphone 1016. Display 1010 is configured to output visual information (e.g., a graphical user interface (GUI) generated and/or rendered by processors 1004). In some embodiments, display 1010 is a touch screen that is configured to also receive touch-based input. Display 1010 may be implemented using liquid crystal display (LCD) technology, light-emitting diode (LED) technology, organic LED (OLED) technology, organic electro luminescence (OEL) technology, or any other type of display technologies. Sensors 1012 may include any number of different types of sensors for measuring a physical quantity (e.g., temperature, force, pressure, acceleration, orientation, light, radiation, etc.). Speaker 1014 is configured to output audio information and microphone 1016 is configured to receive audio input. One of ordinary skill in the art will appreciate that I/O system 1008 may include any number of additional, fewer, and/or different components. For instance, I/O system 1008 may include a keypad or keyboard for receiving input, a port for transmitting data, receiving data and/or power, and/or communicating with another device or component, an image capture component for capturing photos and/or videos, etc.

Communication system 1018 serves as an interface for receiving data from, and transmitting data to, other devices, computer systems, and networks. For example, communication system 1018 may allow computing device 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1018 may provide components configured for wired communication (e.g., Ethernet) in addition to or instead of components configured for wireless communication.

Storage system 1020 handles the storage and management of data for computing device 1000. Storage system 1020 may be implemented by one or more non-transitory machine-readable mediums that are configured to store software (e.g., programs, code modules, data constructs, instructions, etc.) and store data used for, or generated during, the execution of the software.

In this example, storage system 1020 includes operating system 1022, one or more applications 1024, I/O module 1026, and communication module 1028. Operating system 1022 includes various procedures, sets of instructions, software components and/or drivers for controlling and managing general system tasks (e.g., memory management, storage device control, power management, etc.) and facilitates communication between various hardware and software components. Operating system 1022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1024 can include any number of different applications installed on computing device 1000. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1026 manages information received via input components (e.g., display 1010, sensors 1012, and microphone 1016) and information to be outputted via output components (e.g., display 1010 and speaker 1014). Communication module 1028 facilitates communication with other devices via communication system 1018 and includes various software components for handling data received from communication system 1018.

One of ordinary skill in the art will realize that the architecture shown in FIG. 10 is only an example architecture of computing device 1000, and that computing device 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
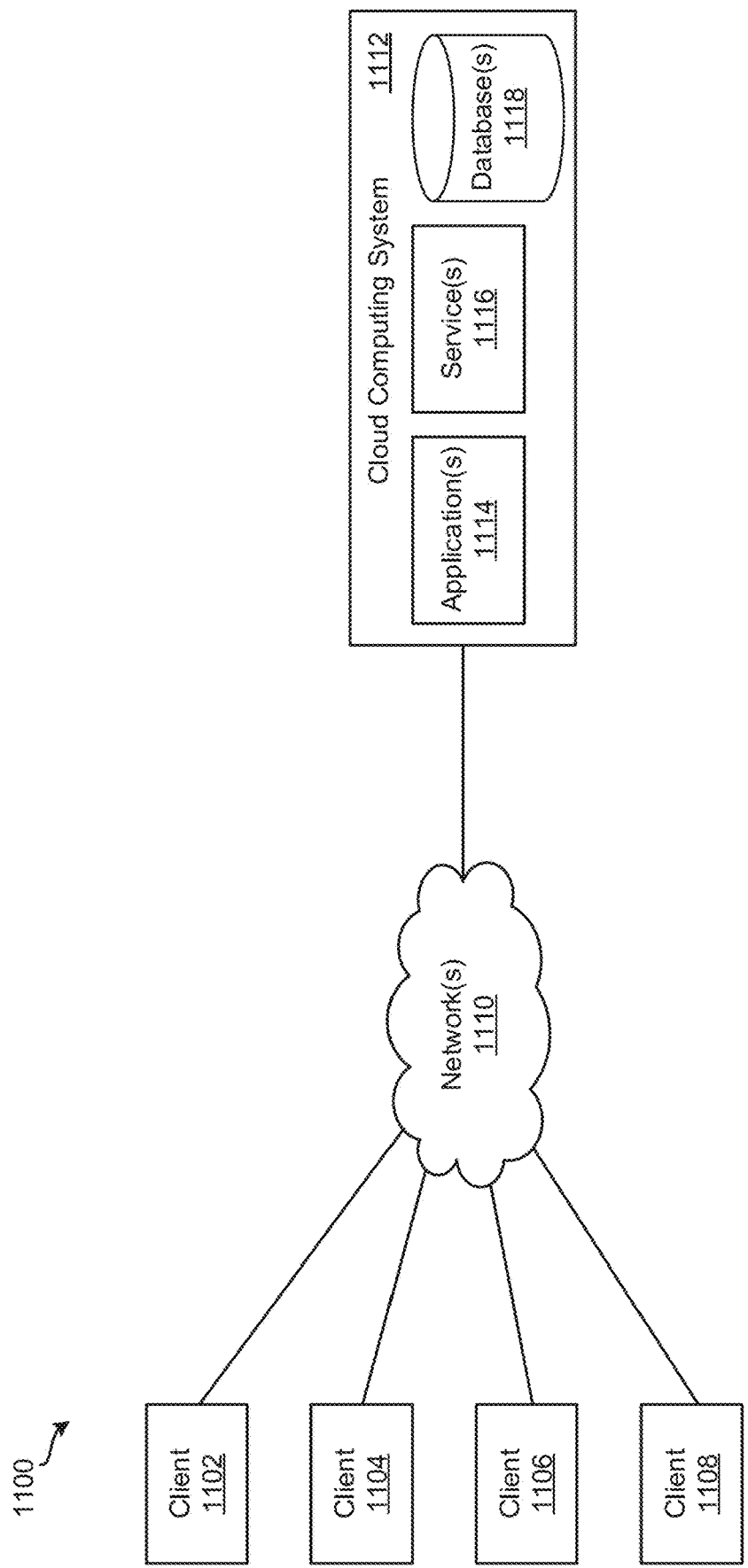
FIG. 11 illustrates an exemplary system, in which various embodiments may be implemented.

FIG. 11 illustrates an exemplary system 1100 for implementing various embodiments described above. For example, one of client devices 1102-1108 may be used to implement client 101 and cloud computing system 1112 may be used to implement computing system 100. As shown, system 1100 includes client devices 1102-1108, one or more networks 1110, and cloud computing system 1112. Cloud computing system 1112 is configured to provide resources and data to client devices 1102-1108 via networks 1110. In some embodiments, cloud computing system 1100 provides resources to any number of different users (e.g., customers, tenants, organizations, etc.). Cloud computing system 1112 may be implemented by one or more computer systems (e.g., servers), virtual machines operating on a computer system, or a combination thereof.

As shown, cloud computing system 1112 includes one or more applications 1114, one or more services 1116, and one or more databases 1118. Cloud computing system 1100 may provide applications 1114, services 1116, and databases 1118 to any number of different customers in a self-service, subscription-based, elastically scalable, reliable, highly available, and secure manner.

In some embodiments, cloud computing system 1100 may be adapted to automatically determine data types of variables in program strings written on client 101 received by cloud computing system 1100. Cloud computing system 1100 may provide cloud services via different deployment models. For example, cloud services may be provided under a public cloud model in which cloud computing system 1100 is owned by an organization selling cloud services and the cloud services are made available to the general public or different industry enterprises. As another example, cloud services may be provided under a private cloud model in which cloud computing system 1100 is operated solely for a single organization and may provide cloud services for one or more entities within the organization. The cloud services may also be provided under a community cloud model in which cloud computing system 1100 and the cloud services provided by cloud computing system 1100 are shared by several organizations in a related community. The cloud services may also be provided under a hybrid cloud model, which is a combination of two or more of the aforementioned different models.

In some instances, any one of applications 1114, services 1116, and databases 1118 made available to client devices 1102-1108 via networks 1110 from cloud computing system 1100 is referred to as a "cloud service." Typically, servers and systems that make up cloud computing system 1100 are different from the on-premises servers and systems of a customer. For example, cloud computing system 1100 may host an application and a user of one of client devices 1102-1108 may order and use the application via networks 1110.

Applications 1114 may include software applications that are configured to execute on cloud computing system 1112 (e.g., a computer system or a virtual machine operating on a computer system) and be accessed, controlled, managed, etc. via client devices 1102-1108. In some embodiments, applications 1114 may include server applications and/or mid-tier applications (e.g., HTTP (hypertext transport protocol) server applications, FTP (file transfer protocol) server applications, CGI (common gateway interface) server applications, JAVA server applications, etc.). Services 1116 are software components, modules, application, etc. that are configured to execute on cloud computing system 1112 and provide functionalities to client devices 1102-1108 via networks 1110. Services 1116 may be web-based services or on-demand cloud services.

Databases 1118 are configured to store and/or manage data that is accessed by applications 1114, services 1116, and/or client devices 1102-1108. For instance, inventory data storage 130 may be stored in databases 1118. Databases 1118 may reside on a non-transitory storage medium local to (and/or resident in) cloud computing system 1112, in a storage-area network (SAN), on a non-transitory storage medium local located remotely from cloud computing system 1112. In some embodiments, databases 1118 may include relational databases that are managed by a relational database management system (RDBMS). Databases 1118 may be a column-oriented databases, row-oriented databases, or a combination thereof. In some embodiments, some or all of databases 1118 are in-memory databases. That is, in some such embodiments, data for databases 1118 are stored and managed in memory (e.g., random access memory (RAM)).

Client devices 1102-1108 are configured to execute and operate a client application (e.g., a web browser, a proprietary client application, etc.) that communicates with applications 1114, services 1116, and/or databases 1118 via networks 1110. This way, client devices 1102-1108 may access the various functionalities provided by applications 1114, services 1116, and databases 1118 while applications 1114, services 1116, and databases 1118 are operating (e.g., hosted) on cloud computing system 1100. Client devices 1102-1108 may be computer system 900 or computing device 1000, as described above by reference to FIGS. 9 and 10, respectively. Although system 1100 is shown with four client devices, any number of client devices may be supported.

Networks 1110 may be any type of network configured to facilitate data communications among client devices 1102-1108 and cloud computing system 1112 using any of a variety of network protocols. Networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving a programming language statement that includes a variable, an expression to which the variable is set, and a request to determine a data type of the variable;
deducing a data type of the expression by at least
determining an element type for an individual element of the expression, and
processing the individual element based on whether the element type determined corresponds to a scalar expression or a tabular expression; and
assigning the data type of the expression as the data type of the variable, the data type of the variable for use when the programming language statement is compiled into machine executable code,
wherein said deducing the data type of the expression includes:
parsing the expression into one or more nodes;
as a result of determining that the expression comprises a scalar expression, using a scalar-type deductor to deduce the data type of the expression; and
as a result of determining that the expression comprises a tabular expression, using a table-type deductor to deduce the data type of the expression
wherein using the scalar-type deductor includes:
mapping each of the one or more nodes of the expression to respective data types; and
determining the data type of the expression based on the respective data types of each of the one or more nodes of the expression,
and wherein mapping a node of the one or more nodes comprises, when the node is a constant, using a constant mapping function to map the node to an integer data type, a decimal data type, or a string data type.

2. The method of claim 1, wherein when the node is an integer, the constant mapping function analyzes ASCII code associated with the integer for mapping the integer to the integer data type.

3. The method of claim 1, wherein mapping a node of the one or more nodes comprises, when the node is a variable, using a variable table to look up a data type of the variable.

4. The method of claim 1, wherein mapping a node of the one or more nodes comprises, when the node is a function, using a function table to look up a data type of the function based on one or more input types of the function.

5. The method of claim 1, wherein mapping a node of the one or more nodes comprises, when the node is a subquery, using the table-type deductor to determine a data type of the result-set of the subquery.

6. The method of claim 1, wherein using the table-type deductor includes:
processing a FROM clause in the expression to build an internal type map, the internal type map including a set of column names and a set of data types associated with the set of column names; and
processing a SELECT clause in the expression based on the internal type map to deduce the data type of the expression.

7. The method of claim 6, wherein processing the FROM clause to build the internal type map includes obtaining the set of column names and the set of data types associated with the set of column names from metadata associated with a set of tables specified in the FROM clause.

8. The method of claim 6, wherein said processing the SELECT clause includes processing a projection list specified within the SELECT clause to retrieve at least one column name in the set of column names and at least one data type in the set of data types associated with the set of column names from the internal type map to deduce the data type of the expression.

9. The method of claim 8, wherein when the projection list includes a set of scalar expressions, processing the SELECT clause includes using the scalar type deductor to deduce the data type of the expression.

10. A non-transitory machine-readable medium storing instructions that, as a result of execution by at least one processing unit of a device, causes the device to perform operations comprising:
receiving a programming language statement that includes a variable, an expression to which the variable is set, and a request to determine a data type of the variable;
deducing a data type of the expression, by at least
determining an element type of an individual element of the expression, and
processing the individual element based on whether the element type determined corresponds to a scalar expression or a tabular expression; and
assigning the data type of the expression as the data type of the variable, the data type of the variable for use when the programming language is compiled into machine executable code,
wherein said deducing the data type of the expression includes:
parsing the expression into one or more nodes;
as a result of determining that the expression comprises a scalar expression, using a scalar-type deductor to deduce the data type of the expression; and
as a result of determining that the expression comprises a tabular expression,
using a table-type deductor to deduce the data type of the expression,
wherein using the scalar-type deductor includes:
mapping each of the one or more nodes of the expression to respective data types; and
determining the data type of the expression based on the respective data types of each of the one or more nodes of the expression,
wherein mapping a node of the one or more nodes comprises, when the node is a constant, using a constant mapping function to map the node to an integer data type, a decimal data type, or a string data type,
wherein mapping a node of the one or more nodes comprises, when the node is a variable, using a variable table to look up a data type of the variable, wherein mapping a node of the one or more nodes comprises, when the node is a subquery, using the table-type deductor to determine a data type of the result-set of the subquery.

11. The non-transitory machine-readable medium of claim 10, wherein using the table-type deductor includes:
processing a FROM clause in the expression to build an internal type map, the internal type map including a set of column names and a set of data types associated with the set of column names; and
processing a SELECT clause in the expression based on the internal type map to deduce the data type of the expression.

12. The non-transitory machine-readable medium of claim 11, wherein processing the FROM clause to build the internal type map includes obtaining the set of column names and the set of data types associated with the set of column names from metadata associated with a set of tables specified in the FROM clause, and wherein said processing the SELECT clause includes processing a projection list specified within the SELECT clause to retrieve at least one column name in the set of column names and at least one data type in the set of data types associated with the set of column names from the internal type map to deduce the data type of the expression.

13. The non-transitory machine-readable medium of claim 10, wherein when the node is an integer, the constant mapping function analyzes ASCII code associated with the integer for mapping the integer to the integer data type.

14. A system comprising:
a set of processing units; and
a non-transitory machine-readable medium storing instructions that when executed by at least one processing unit in the set of processing units cause the at least one processing unit to:
receive a programming language statement that includes a variable, an expression to which the variable is set, and a request to determine a data type of the variable;
deduce a data type of the expression by at least
determining an element type for an individual element of the expression, and
processing the individual element based on whether the element type determined corresponds to a scalar expression or a tabular expression; and
assigning the data type of the expression as the data type of the variable, the data type of the variable for use when the programming language statement is compiled into machine executable code,
wherein execution of said instructions cause the at least one processing unit to:
parse the expression into one or more nodes;
as a result of the expression including a scalar expression, use a scalar-type deductor to deduce the data type of the expression; and
as a result of the expression including a tabular expression, use a table-type deductor to deduce the data type of the expression, and
wherein using the scalar type deductor includes:
mapping each of the one or more nodes of the expression to respective data types; and
determining the data type of the expression based on the respective data types of each of the one or more nodes of the expression,
wherein mapping a node of the one or more nodes comprises, when the node is a constant, using a constant mapping function to map the node to an integer data type, a decimal data type, or a string data type.

15. The system of claim 14, wherein when the node is an integer, the constant mapping function analyzes ASCII code associated with the integer for mapping the integer to the integer data type.

* * * * *